(12) United States Patent
Park

(10) Patent No.: US 10,001,623 B2
(45) Date of Patent: Jun. 19, 2018

(54) OPTICAL IMAGING SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days. days.

(21) Appl. No.: 15/292,369

(22) Filed: Oct. 13, 2016

(65) Prior Publication Data
US 2017/0219798 A1 Aug. 3, 2017

(30) Foreign Application Priority Data
Jan. 28, 2016 (KR) .................. 10-2016-0010776

(51) Int. Cl.
| G02B 13/18 | (2006.01) |
| G02B 9/64 | (2006.01) |
| G02B 13/00 | (2006.01) |
| G02B 27/00 | (2006.01) |
| G02B 3/04 | (2006.01) |
| G02B 5/00 | (2006.01) |

(52) U.S. Cl.
CPC ............ *G02B 9/64* (2013.01); *G02B 13/0045* (2013.01); *G02B 27/0025* (2013.01); *G02B 3/04* (2013.01); *G02B 5/005* (2013.01); *G02B 13/18* (2013.01)

(58) Field of Classification Search
CPC .. G02B 13/0045; G02B 27/0025; G02B 9/64; G02B 13/18; G02B 5/005; G02B 3/04

USPC .................. 359/708, 713, 740, 755–759
See application file for complete search history.

(56) References Cited

U.S. PATENT DOCUMENTS

| 9,766,433 B2 * | 9/2017 | Chen ................. G02B 13/0045 |
| 2015/0070783 A1 | 3/2015 | Hashimoto |
| 2015/0247993 A1 | 9/2015 | Ishizaka |
| 2015/0268448 A1 | 9/2015 | Kubota et al. |
| 2016/0033743 A1 | 2/2016 | Chen |

FOREIGN PATENT DOCUMENTS

| JP | 2015-203792 A | 11/2015 |
| TW | I507723 B | 11/2015 |

OTHER PUBLICATIONS

Korean Office Action dated Jun. 19, 2017 in corresponding Korean Patent Application No. 10-2016-0010776 (6 pages in English and 5 pages in Korean).

* cited by examiner

*Primary Examiner* — Evelyn A Lester
(74) *Attorney, Agent, or Firm* — NSIP Law

(57) ABSTRACT

An optical imaging system includes first through seventh lenses. The first lens includes positive refractive power, the second lens includes a positive refractive power, the third lens includes a negative refractive power, an object-side surface thereof being convex, the fourth lens includes a positive refractive power, the fifth lens includes a negative refractive power, the sixth lens includes a negative refractive power, and the seventh lens includes a negative refractive power and having an inflection point formed on an image-side surface thereof. The first to seventh lenses are sequentially disposed from an object side toward an imaging plane.

36 Claims, 16 Drawing Sheets

FIRST EMBODIMENT

FOV = 76.20    F No. = 1.750    f = 4.35

| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S0 | STOP | Infinity | -0.2100 | | | |
| S1 | FIRST LENS | 2.1503 | 0.4827 | 1.547 | 56.100 | 7.138 |
| S2 | | 4.4117 | 0.1652 | | | |
| S3 | SECOND LENS | 3.2604 | 0.5299 | 1.547 | 56.100 | 4.507 |
| S4 | | -9.4947 | 0.0200 | | | |
| S5 | STOP | Infinity | 0.0000 | | | |
| S6 | THIRD LENS | 7.9061 | 0.2500 | 1.657 | 21.500 | -4.990 |
| S7 | | 2.2885 | 0.3146 | | | |
| S8 | FOURTH LENS | 40.3371 | 0.3709 | 1.620 | 26.000 | 15.993 |
| S9 | | -13.1017 | 0.1110 | | | |
| S10 | FIFTH LENS | -6.4205 | 0.3062 | 1.620 | 26.000 | -999.997 |
| S11 | | -6.6061 | 0.4338 | | | |
| S12 | SIXTH LENS | 10.0909 | 0.6337 | 1.547 | 56.100 | -999.999 |
| S13 | | 9.6881 | 0.1000 | | | |
| S14 | SEVENTH LENS | 1.9520 | 0.5564 | 1.537 | 55.700 | -8.758 |
| S15 | | 1.2421 | 0.2350 | | | |
| S16 | FILTER | Infinity | 0.1100 | 1.519 | 64.200 | |
| S17 | | Infinity | 0.6752 | | | |
| S18 | IMAGING PLANE | Infinity | | | | |

FIG. 3

| FIRST EMBODIMENT | S1 | S2 | S3 | S4 | S6 | S7 | S8 | S9 | S10 | S11 | S12 | S13 | S14 | S15 |
|---|---|---|---|---|---|---|---|---|---|---|---|---|---|---|
| K | -1.24392 | -4.90273 | 1.79412 | 5.29520 | 44.53026 | -8.07477 | 0.00000 | 0.00000 | -1.14593 | -0.64068 | 0.00000 | -36.08796 | -11.16889 | -5.66288 |
| A | -0.01321 | -0.06134 | -0.03880 | -0.02917 | -0.10876 | -0.01194 | -0.05941 | -0.04119 | -0.01863 | 0.00650 | 0.12097 | 0.09099 | -0.16457 | -0.10952 |
| B | 0.00040 | -0.02024 | -0.01297 | -0.03913 | 0.12310 | 0.09849 | 0.10949 | -0.01053 | -0.10916 | -0.18753 | -0.29834 | -0.07616 | 0.11085 | 0.05771 |
| C | -0.03680 | 0.01649 | -0.00976 | 0.02875 | -0.18022 | -0.14163 | -0.40443 | 0.06974 | 0.26836 | 0.38105 | 0.32752 | 0.01793 | -0.04976 | -0.02393 |
| D | 0.05285 | 0.03897 | 0.10169 | -0.09303 | 0.27645 | 0.15345 | 1.05535 | -0.09801 | -0.25761 | -0.44725 | -0.27984 | 0.00297 | 0.01365 | 0.00658 |
| E | -0.04625 | -0.05373 | -0.09690 | 0.05251 | -0.31256 | -0.09838 | -1.92640 | -0.04014 | -0.05355 | 0.33978 | 0.16940 | -0.00329 | -0.00223 | -0.00110 |
| F | 0.02385 | 0.03062 | 0.03522 | -0.01660 | 0.19489 | 0.03339 | 2.38008 | 0.20465 | 0.32920 | -0.16188 | -0.06727 | 0.00091 | 0.00021 | 0.00031 |
| G | -0.00499 | -0.00568 | -0.00436 | 0.00285 | -0.04911 | -0.00233 | -1.87160 | -0.17857 | -0.27995 | 0.04540 | 0.01614 | -0.00011 | -0.00001 | -0.00001 |
| H | 0.00000 | 0.00000 | 0.00000 | 0.00000 | 0.00000 | 0.00000 | 0.84384 | 0.06613 | 0.10197 | -0.00650 | -0.00204 | 0.00001 | 0.00000 | 0.00000 |
| J | 0.00000 | 0.00000 | 0.00000 | 0.00000 | 0.00000 | 0.00000 | -0.16722 | -0.00912 | -0.01410 | 0.00031 | 0.00010 | 0.00000 | 0.00000 | 0.00000 |

FIG. 4

SECOND EMBODIMENT

| | FOV = | 76.20 | F No. = | 1.750 | f = | 4.35 | |
|---|---|---|---|---|---|---|---|
| SURFACE NO. | | | RADIUS OF CURVATURE | THICKNESS/ DISTANCE | REFRACTIVE INDEX | ABBE NUMBER | FOCAL LENGTH |
| S0 | STOP | | Infinity | -0.2100 | | | |
| S1 | FIRST LENS | | 2.1232 | 0.4795 | 1.547 | 56.100 | 7.178 |
| S2 | | | 4.2588 | 0.1647 | | | |
| S3 | SECOND LENS | | 3.1876 | 0.5303 | 1.547 | 56.100 | 4.481 |
| S4 | | | -9.9483 | 0.0200 | | | |
| S5 | STOP | | Infinity | 0.0000 | | | |
| S6 | THIRD LENS | | 7.9008 | 0.2500 | 1.657 | 21.500 | -4.995 |
| S7 | | | 2.2904 | 0.3149 | | | |
| S8 | FOURTH LENS | | 65.7827 | 0.3491 | 1.620 | 26.000 | 15.441 |
| S9 | | | -11.1819 | 0.0900 | | | |
| S10 | FIFTH LENS | | -6.9836 | 0.3016 | 1.620 | 26.000 | -499.984 |
| S11 | | | -7.2627 | 0.4421 | | | |
| S12 | SIXTH LENS | | 11.4194 | 0.6600 | 1.547 | 56.100 | -500.528 |
| S13 | | | 10.7379 | 0.1000 | | | |
| S14 | SEVENTH LENS | | 1.9813 | 0.5597 | 1.537 | 55.700 | -8.390 |
| S15 | | | 1.2404 | 0.2305 | | | |
| S16 | FILTER | | Infinity | 0.1100 | 1.519 | 64.200 | |
| S17 | | | Infinity | 0.6750 | | | |
| S18 | IMAGING PLANE | | Infinity | | | | |

FIG. 7

| SECOND EMBODIMENT | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| K | -1.22698 | -4.83718 | -1.78294 | -5.39520 | 44.61528 | -8.07429 | 0.00000 | 0.00000 | -0.51995 | 0.26328 | 0.00000 | -36.08796 | -11.97126 | -5.83024 |
| A | -0.01327 | -0.06163 | -0.03962 | -0.02882 | -0.10996 | -0.01227 | -0.06388 | -0.05088 | -0.02871 | 0.00526 | 0.11849 | 0.08835 | -0.16473 | -0.10783 |
| B | 0.00156 | -0.02022 | -0.08923 | -0.04643 | 0.12302 | 0.09977 | 0.13954 | 0.04173 | -0.05962 | -0.18689 | -0.29970 | -0.07844 | 0.11141 | 0.05564 |
| C | -0.04143 | 0.01343 | -0.02370 | 0.11225 | -0.17733 | -0.14371 | -0.51205 | -0.01129 | 0.20430 | 0.39958 | 0.34570 | 0.01300 | -0.05011 | -0.02304 |
| D | 0.05782 | 0.24667 | 0.12644 | -0.12632 | 0.28700 | 0.16792 | 1.25954 | -0.16886 | -0.37057 | -0.53792 | -0.31554 | 0.00528 | 0.01375 | 0.00836 |
| E | -0.05064 | -0.06120 | -0.11783 | 0.07566 | -0.34362 | -0.12431 | -2.15279 | 0.14128 | 0.37144 | 0.49067 | 0.20628 | -0.00391 | -0.00224 | -0.00107 |
| F | 0.02563 | 0.03414 | 0.04371 | -0.02831 | 0.32172 | 0.05262 | 2.54854 | -0.10616 | -0.18078 | -0.30095 | -0.08833 | 0.00190 | 0.00021 | 0.00010 |
| G | -0.00519 | -0.00734 | -0.00572 | 0.00381 | -0.05681 | -0.00735 | -1.97527 | 0.15349 | 0.03765 | 0.11627 | 0.02287 | -0.00012 | -0.00001 | -0.00001 |
| H | 0.00000 | 0.00000 | 0.00000 | 0.00000 | 0.00000 | 0.00000 | 0.00000 | 0.89620 | -0.04280 | 0.00426 | -0.02543 | -0.00314 | 0.00031 | 0.00000 | 0.00000 |
| J | 0.00000 | 0.00000 | 0.00000 | 0.00000 | 0.00000 | 0.00000 | 0.00003 | -0.18082 | 0.00521 | -0.00203 | 0.00338 | 0.00017 | 0.00000 | 0.00000 | 0.00000 |

FIG. 8

THIRD EMBODIMENT

FOV = 76.10   F No. = 1.750   f = 4.35

| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S0 | STOP | Infinity | -0.2100 | | | |
| S1 | FIRST LENS | 2.1318 | 0.4778 | 1.547 | 56.100 | 7.190 |
| S2 | | 4.2912 | 0.1655 | | | |
| S3 | SECOND LENS | 3.2023 | 0.5315 | 1.547 | 56.100 | 4.481 |
| S4 | | -9.7955 | 0.0200 | | | |
| S5 | STOP | Infinity | 0.0000 | | | |
| S6 | THIRD LENS | 7.9039 | 0.2500 | 1.657 | 21.500 | -4.984 |
| S7 | | 2.2874 | 0.3180 | | | |
| S8 | FOURTH LENS | 47.9098 | 0.3464 | 1.620 | 26.000 | 15.441 |
| S9 | | -11.9321 | 0.0949 | | | |
| S10 | FIFTH LENS | -6.8474 | 0.3085 | 1.620 | 26.000 | -300.000 |
| S11 | | -7.2317 | 0.4329 | | | |
| S12 | SIXTH LENS | 10.5871 | 0.6594 | 1.547 | 56.100 | -300.000 |
| S13 | | 9.7261 | 0.1000 | | | |
| S14 | SEVENTH LENS | 1.9667 | 0.5649 | 1.537 | 55.700 | -8.744 |
| S15 | | 1.2471 | 0.2306 | | | |
| S16 | FILTER | Infinity | 0.1100 | 1.519 | 64.200 | |
| S17 | | Infinity | 0.6750 | | | |
| S18 | IMAGING PLANE | Infinity | | | | |

FIG. 11

| THIRD EMBODIMENT | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|
| K | -1.23553 | -4.90668 | -1.80993 | -5.29520 | 44.56484 | -8.01159 | 0.00000 | 0.00000 | -1.17448 | 0.41785 | 0.00000 | -36.08796 | -11.25685 | -5.80230 |
| A | -0.01329 | -0.86156 | -0.03836 | -0.02951 | -0.10828 | -0.01135 | -0.06383 | 0.05142 | -0.82774 | 0.06680 | 0.12140 | 0.08845 | -0.16502 | -0.10781 |
| B | 0.00077 | -0.02003 | -0.01044 | -0.04482 | 0.11594 | 0.09845 | 0.15797 | 0.05774 | -0.03984 | -0.17912 | -0.30518 | -0.07153 | 0.11164 | 0.05565 |
| C | -0.03958 | 0.01368 | -0.01897 | 0.10380 | -0.16988 | -0.14278 | -0.61943 | -0.13718 | 0.04020 | 0.34171 | 0.34619 | 0.01361 | -0.05044 | -0.02309 |
| D | 0.05534 | 0.04481 | 0.11731 | -0.11258 | 0.26918 | 0.16258 | 1.62990 | 0.25228 | 0.15638 | -0.38378 | -0.31216 | 0.00520 | 0.01392 | 0.00641 |
| E | -0.04888 | -0.05901 | -0.10973 | 0.06576 | -0.31563 | -0.11530 | -2.93045 | -0.39658 | -0.30695 | 0.28861 | 0.20062 | -0.00397 | -0.00228 | -0.00108 |
| F | 0.02504 | 0.03309 | 0.04044 | -0.02106 | 0.20122 | 0.04715 | 3.53475 | 0.42307 | 0.54049 | -0.14205 | -0.08450 | 0.00103 | 0.00022 | 0.00011 |
| G | -0.00512 | -0.00716 | -0.00526 | 0.00341 | -0.06130 | -0.00643 | -2.71635 | -0.25844 | -0.41297 | 0.04319 | 0.02145 | -0.00012 | -0.00001 | -0.00001 |
| H | 0.00000 | 0.00000 | 0.00000 | 0.00000 | 0.00000 | 0.00000 | 1.20127 | 0.07874 | 0.13461 | -0.00720 | -0.00286 | 0.00001 | 0.00000 | 0.00000 |
| J | 0.00000 | 0.00000 | 0.00000 | 0.00000 | 0.00000 | 0.00000 | -0.23386 | -0.00968 | -0.01764 | 0.00047 | 0.00015 | 0.00000 | 0.00000 | 0.00000 |

FIG. 12

FOURTH EMBODIMENT

FOV = 76.10    F No. = 1.750    f = 4.35

| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S0 | STOP | Infinity | -0.2100 | | | |
| S1 | FIRST LENS | 2.1336 | 0.4814 | 1.547 | 56.100 | 7.186 |
| S2 | | 4.2990 | 0.1688 | | | |
| S3 | SECOND LENS | 3.1938 | 0.5283 | 1.547 | 56.100 | 4.480 |
| S4 | | -9.8805 | 0.0200 | | | |
| S5 | STOP | Infinity | 0.0000 | | | |
| S6 | THIRD LENS | 7.9006 | 0.2500 | 1.657 | 21.500 | -4.985 |
| S7 | | 2.2873 | 0.3187 | | | |
| S8 | FOURTH LENS | 53.3405 | 0.3470 | 1.620 | 26.000 | 13.902 |
| S9 | | -10.2554 | 0.1090 | | | |
| S10 | FIFTH LENS | -5.6738 | 0.3036 | 1.620 | 26.000 | -100.000 |
| S11 | | -6.3732 | 0.4250 | | | |
| S12 | SIXTH LENS | 10.0635 | 0.6524 | 1.547 | 56.100 | -100.000 |
| S13 | | 8.3039 | 0.1000 | | | |
| S14 | SEVENTH LENS | 1.9366 | 0.5678 | 1.537 | 55.700 | -9.448 |
| S15 | | 1.2581 | 0.2289 | | | |
| S16 | FILTER | Infinity | 0.1100 | 1.519 | 64.200 | |
| S17 | | Infinity | 0.6750 | | | |
| S18 | IMAGING PLANE | Infinity | | | | |

FIG. 15

| FOURTH EMBODIMENT | S1 | S2 | S3 | S4 | S6 | S7 | S8 | S9 | S10 | S11 | S12 | S13 | S14 | S15 |
|---|---|---|---|---|---|---|---|---|---|---|---|---|---|---|
| K | -1.23471 | -4.99322 | -1.83512 | -5.19520 | 44.55884 | -7.96336 | 0.00000 | 0.00000 | -0.92598 | -0.56339 | 0.00000 | -36.08796 | -10.93069 | -5.78764 |
| A | -0.01336 | -0.06121 | -0.03903 | -0.02641 | -0.10513 | -0.00939 | -0.06008 | -0.04442 | -0.01845 | 0.01229 | 0.12484 | 0.08351 | -0.16595 | -0.10827 |
| B | 0.00133 | -0.01840 | -0.08804 | -0.06047 | 0.09506 | 0.08586 | 0.11621 | 0.00545 | -0.09283 | -0.19892 | -0.31693 | -0.05798 | 0.11317 | 0.05616 |
| C | -0.04120 | 0.00590 | -0.03342 | 0.15226 | -0.09863 | -0.09114 | -0.41819 | 0.01576 | 0.16150 | 0.37894 | 0.36356 | 0.01184 | -0.05130 | -0.02340 |
| D | 0.05794 | 0.05946 | 0.14928 | -0.19071 | 0.13700 | 0.04104 | 1.03136 | 0.00014 | 0.03659 | -0.40996 | -0.32702 | 0.00593 | 0.01422 | 0.00655 |
| E | -0.05100 | -0.07343 | -0.14506 | 0.13339 | -0.18264 | 0.03789 | -1.81825 | -0.14310 | -0.50381 | 0.28427 | 0.20933 | -0.00421 | -0.00234 | -0.00112 |
| F | 0.02585 | 0.04013 | 0.05447 | -0.05068 | 0.13336 | -0.05072 | 2.20573 | 0.25502 | 0.73951 | -0.11977 | -0.08844 | 0.00108 | 0.00023 | 0.00011 |
| G | -0.00524 | -0.00850 | -0.00921 | 0.00857 | -0.03753 | 0.01870 | -1.74022 | -0.17853 | -0.50388 | 0.02693 | 0.02283 | -0.00013 | -0.00001 | -0.00001 |
| H | 0.00000 | 0.00000 | 0.00000 | 0.00000 | 0.00000 | 0.00000 | 0.80393 | 0.05609 | 0.16826 | -0.00204 | -0.00317 | 0.00001 | 0.00000 | 0.00000 |
| J | 0.00000 | 0.00000 | 0.00000 | 0.00000 | 0.00000 | 0.00000 | -0.16605 | -0.00655 | -0.02338 | -0.00011 | 0.00018 | 0.00000 | 0.00000 | 0.00000 |

FIG. 16

OPTICAL IMAGING SYSTEM

CROSS-REFERENCE TO RELATED APPLICATION(S)

This application claims benefit under 35 USC 119(a) of Korean Patent Application No. 10-2016-0010776 filed on Jan. 28, 2016 in the Korean Intellectual Property Office, the disclosure of which is incorporated herein by reference in its entirety.

BACKGROUND

1. Field

The following description relates to an optical imaging system that includes seven lenses.

2. Description of Related Art

A monitoring camera for an unmanned aerial vehicle is commonly used to monitor a wide region, and a distance from such a monitoring camera to a target to be monitored may be significantly large. Therefore, such monitoring camera requires an optical imaging system that has a wide field of view and in which a high level of resolution is realized. Similarly, a monitoring camera for a vehicle is used to capture images of vehicles at a front and at a rear of the vehicle. Therefore, a monitoring camera for such vehicle requires an optical imaging system in which a high level of resolution is realized.

An optical imaging system containing lenses formed of glass enables a camera having a high level of resolution to be realized. However, such an optical imaging system including lenses made of glass has a significantly heavier weight than an optical imaging system containing lenses made of plastic, thus, making it difficult to mount the optical imaging system with lenses formed of glass in a small terminal.

In contrast, an optical imaging system including lenses made of plastic is relatively lightweight. However, it may be difficult to realize a higher level of resolution with an optical imaging system including lenses made of plastic than that of an optical imaging system including lenses made of glass. Therefore, there is a need to develop an optical imaging system that can realize a high level of resolution, while being lightweight.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure may provide an optical imaging system having a high level of resolution.

In accordance with an embodiment, there may be provided an optical imaging system, including: a first lens including a positive refractive power; a second lens including a positive refractive power; a third lens including a negative refractive power, an object-side surface of the third lens being convex; a fourth lens including a positive refractive power; a fifth lens including a negative refractive power; a sixth lens including a negative refractive power; and a seventh lens including a negative refractive power and including an inflection point formed on an image-side surface thereof, wherein the first to seventh lenses are sequentially disposed from an object side toward an imaging plane.

An object-side surface of the first lens may be convex, and an image-side surface of the first lens may be concave.

An object-side surface and an image-side surface of the second lens may be convex.

An image-side surface of the third lens may be concave.

An object-side surface and an image-side surface of the fourth lens may be convex.

An object-side surface of the fifth lens may be concave, and an image-side surface of the fifth lens may be convex.

An object-side surface of the sixth lens may be convex, and an image-side surface of the sixth lens may be concave.

An object-side surface of the seventh lens may be convex, and an image-side surface of the seventh lens may be concave.

The optical imaging system may also include $0 < f1/g < 2.0$, in which f is an overall focal length of the optical imaging system and f1 is a focal length of the first lens.

The optical imaging system may also include $0 < f2/f < 1.5$, in which f is an overall focal length of the optical imaging system and f2 is a focal length of the second lens.

The optical imaging system may also include $-3.0 < f3/f < -1.0$, in which f is an overall focal length of the optical imaging system and f3 is a focal length of the third lens.

The optical imaging system may also include $3.0 < |f4/f|$, in which f is an overall focal length of the optical imaging system and f4 is a focal length of the fourth lens.

The optical imaging system may also include $1.3 < f1/f2$, in which f1 is a focal length of the first lens and f2 is a focal length of the second lens.

The optical imaging system may also include $-2.0 < f2/f3 < 0$, in which f2 is a focal length of the second lens and f3 is a focal length of the third lens.

The optical imaging system may also include $r11/f < 0$, in which is an overall focal length of the optical imaging system and r11 is a radius of curvature of an image-side surface of the fifth lens.

The first to seventh lenses may be spaced apart from each other at predetermined gaps or distances therebetween.

The optical imaging system may also include $V1-V2 < 25$, $25 < V1-V3 < 45$, and $25 < V1-V5 < 45$, in which V1 is an Abbe number of the first lens, V2 is an Abbe number of the second lens, V3 is an Abbe number of the third lens, and V5 is an Abbe number of the fifth lens.

The optical imaging system may also include $f5/f < 0$, $f6/f < 0$, and $f7/f < 0$, of which f is an overall focal length of the optical imaging system, f5 is a focal length of the fifth lens, f6 is a focal length of the sixth lens, and f7 is a focal length of the seventh lens.

The optical imaging system may also include $OAL/f < 1.4$, $BFL/f < 0.4$, $D12/f < 0.1$, and $0.2 < r7/f < 1.5$, of which f is an overall focal length of the optical imaging system, OAL is a distance from the object-side surface of the first lens to the imaging plane, BFL is a distance from the image-side surface of the seventh lens to the imaging plane, D12 is a distance from an image-side surface of the first lens to an object-side surface of the second lens, and r7 is a radius of curvature of an image-side surface of the third lens.

In accordance with an embodiment, there is provided an optical imaging system, including: a first lens; a second lens including a convex object-side surface and a convex image-side surface; a third lens; a fourth lens; a fifth lens including a negative refractive power; a sixth lens including a negative refractive power; and a seventh lens including a convex object-side surface and including an inflection point formed on an image-side surface thereof, wherein the first to seventh lenses are sequentially disposed from an object side toward an imaging plane.

Other features and aspects will be apparent from the following detailed description, the drawings, and the claims.

BRIEF DESCRIPTION OF DRAWINGS

FIG. 3 is a table representing characteristics of lenses of the optical imaging system illustrated in FIG. 1;

FIG. 4 is a table representing aspherical characteristics of the optical imaging system illustrated in FIG. 1;

FIG. 7 is a table representing characteristics of lenses of the optical imaging system illustrated in FIG. 5;

FIG. 8 is a table representing aspherical characteristics of the optical imaging system illustrated in FIG. 5;

FIG. 11 is a table representing characteristics of lenses of the optical imaging system illustrated in FIG. 9;

FIG. 12 is a table representing aspherical characteristics of the optical imaging system illustrated in FIG. 9;

FIG. 15 is a table representing characteristics of lenses of the optical imaging system illustrated in FIG. 13; and FIG. 16 is a table representing aspherical characteristics of the optical imaging system illustrated in FIG. 13.

Figure 1:
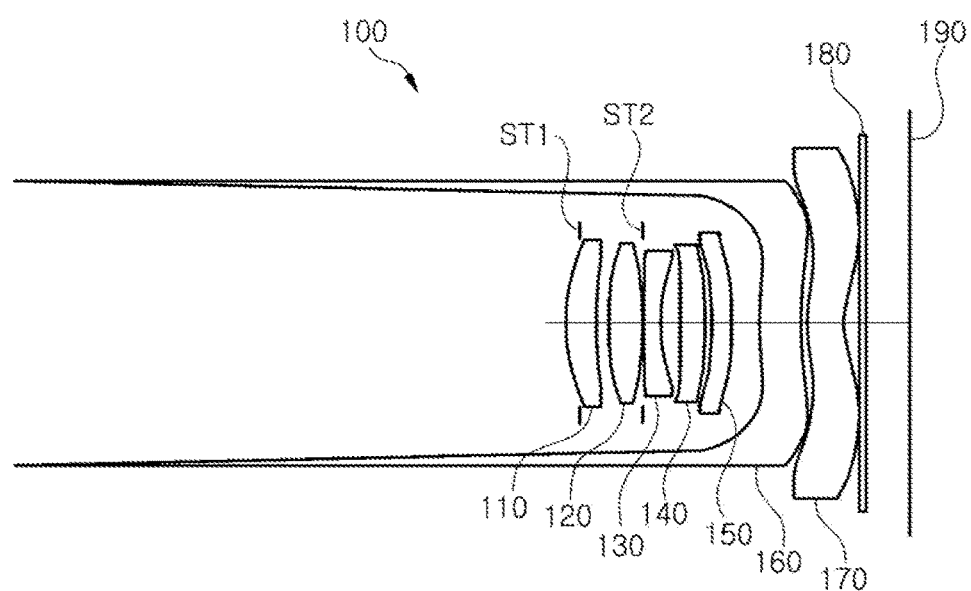
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

Example embodiments of the present disclosure will now be described in detail with reference to the accompanying drawings.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses/distances, TTLs, Y (½ of a diagonal length of the imaging plane), and focal lengths, and other parameters of the lenses are represented in millimeters (mm).

A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

In addition, in an embodiment, shapes of lenses are described and illustrated in relation to optical axis portions of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, a sixth lens, and a seventh lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

In the optical system, according to embodiments, the first to seventh lenses are formed of materials including glass, plastic or other similar types of polycarbonate materials. In another embodiment, at least one of the first through sixth lenses is formed of a material different from the materials forming the other first through sixth lenses.

The first to seventh lenses may be formed of materials having a refractive index different from that of air. For example, the first to seventh lenses are formed of plastic or glass. At least one of the first to seventh lenses may have an aspherical shape. In one example, only the seventh lens of the first to seventh lenses has an aspherical shape. In addition, at least one surface of all of the first to seventh lenses may be aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$ [Equation 1]

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

An optical imaging system, in accordance with an embodiment, includes a plurality of lenses having refractive power. For example, the optical imaging system includes seven lenses. In the following sections, the first to seventh lenses configuring the optical imaging system will be described in detail.

The first lens has a refractive power, such as a positive refractive power or a negative refractive power. For example, the first lens has a positive refractive power. One surface of the first lens may be convex. For example, an object-side surface of the first lens is convex. The first lens may have an aspherical surface. For example, both surfaces of the first lens are aspherical. The first lens may be formed of a material having high light transmissivity and excellent workability. For example, the first lens is formed of plastic. However, a material of the first lens is not limited to plastic. For example, the first lens may also be formed of glass. The first lens may have a predetermined focal length. For example, a focal length of the first lens is predetermined to be in a range of 6.0 to 8.0.

The second lens may have refractive power, such as a positive refractive power or a negative refractive power. For example, the second lens has a positive refractive power. At least one surface of the second lens may be convex. For example, both surfaces of the second lens are convex. The second lens may have an aspherical surface. For example, both surfaces of the second lens are aspherical. The second lens may be formed of a material having high light transmissivity and excellent workability. For example, the second lens is formed of plastic. However, a material of the second lens is not limited to plastic. For example, the second lens may also be formed of glass. The second lens may have a predetermined focal length. For example, a focal length of the second lens is predetermined to be in a range of 3.5 to 5.5.

The third lens may have refractive power, such as a positive refractive power or a negative refractive power. For example, the third lens has a negative refractive power. One surface of the third lens may be convex. For example, an object-side surface of the third lens is convex. The third lens may have an aspherical surface. For example, both surfaces of the third lens are aspherical. The third lens may be formed of a material having high light transmissivity and excellent workability. For example, the third lens is formed of plastic. However, a material of the third lens is not limited to plastic. For example, the third lens may also be formed of glass. The third lens may have a high refractive index. For example, a refractive index of the third lens is 1.60 or more. The third lens may have a predetermined focal length. For example, a focal length of the third lens is predetermined to be in a range of −6.0 to −4.0.

The fourth lens may have refractive power, such as a positive refractive power or a negative refractive power. For example, the fourth lens has a positive refractive power. At least one surface of the fourth lens may be convex. For example, both surfaces of the fourth lens are convex. The fourth lens may have an aspherical surface. For example, both surfaces of the fourth lens are aspherical. The fourth lens may be formed of a material having high light transmissivity and excellent workability. For example, the fourth lens is formed of plastic. However, a material of the fourth lens is not limited to plastic. For example, the fourth lens may also be formed of glass. The fourth lens may have a high refractive index. For example, a refractive index of the fourth lens is 1.60 or more. The fourth lens may have a predetermined focal length. For example, a focal length of the fourth lens is predetermined to be in a range of 12.0 to 17.0.

The fifth lens may have refractive power, such as a positive refractive power or a negative refractive power. For example, the fifth lens has a negative refractive power. At least one surface of the fifth lens may be concave. For example, an object-side surface of the fifth lens is concave. The fifth lens may have an aspherical surface. For example, both surfaces of the fifth lens are aspherical. The fifth lens may be formed of a material having high light transmissivity and excellent workability. For example, the fifth lens is formed of plastic. However, a material of the fifth lens is not limited to plastic. For example, the fifth lens may also be formed of glass. The fifth lens may have a high refractive index. For example, a refractive index of the fifth lens is 1.60 or more. The fifth lens may have a predetermined focal length. For example, a focal length of the fifth lens is predetermined to be in a range of −90.0 or less.

The sixth lens may have refractive power, such as a positive refractive power or a negative refractive power. For example, the sixth lens has a negative refractive power. At least one surface of the sixth lens may be convex. For example, an object-side surface of the sixth lens is convex. The sixth lens may have an aspherical surface and, as shown in FIG. 1, for example, end points of the sixth lens may extend towards the object-side encasing, covering, encapsulating, or over the first through fifth lenses. For example, both surfaces of the sixth lens may be aspherical. The sixth lens may have an inflection point. For example, one or more inflection points is formed on an image-side surface of the sixth lens. The sixth lens may be formed of a material having high light transmissivity and excellent workability. For example, the sixth lens is formed of plastic. However, a material of the sixth lens is not limited to plastic. For example, the sixth lens may also be formed of glass. The sixth lens may have a predetermined focal length. For example, a focal length of the sixth lens is predetermined to be in a range of −90.0 or less.

The seventh lens may have refractive power, such as a positive refractive power or a negative refractive power. For example, the seventh lens has a negative refractive power. At least one surface of the seventh lens may be convex. For example, an object-side surface of the seventh lens is convex. The seventh lens may have an aspherical surface. For example, both surfaces of the seventh lens are aspherical. The seventh lens may have an inflection point. For example, one or more inflection points is formed on an image-side surface of the seventh lens. The seventh lens may be formed of a material having high light transmissivity and excellent workability. For example, the seventh lens is formed of plastic. However, a material of the seventh lens is not limited to plastic. For example, the seventh lens may also be formed of glass. The seventh lens may have a predetermined focal length. For example, a focal length of the seventh lens is predetermined to be in a range of −15.0 or more.

In accordance with alternative examples, each of the first through seventh lenses may be configured in an opposite refractive power from the configuration described above. For example, in an alternative configuration, the first lens has a negative refractive power, the second lens has a negative refractive power, the third lens has a positive refractive power, the fourth lens has a negative refractive power, the fifth lens has a positive refractive power, the sixth lens has a positive refractive power, and the seventh lens has a positive refractive power.

The optical imaging system may include a stop. For example, the optical imaging system includes a first stop disposed adjacent to the object-side surface of the first lens. In addition, the optical imaging system includes a second stop disposed between the second lens and the third lens.

The optical imaging system includes an image sensor. The image sensor is configured to realize a high level of resolution. For example, a unit size of pixels configuring the image sensor is 1.12 μm or less. The image sensor forms an imaging plane.

The optical imaging system may include a filter. For example, the optical imaging system includes a filter disposed between the seventh lens and the image sensor. The filter may filter a partial wavelength from incident light that is incident through the first to seventh lenses. For example, the filter filters an infrared wavelength of the incident light.

The optical imaging system satisfies the following Conditional Expressions:

$0 < f1/f < 2.0$ [Conditional Expression 1]

$V1 - V2 < 25$ [Conditional Expression 2]

$25 < V1 - V3 < 45$ [Conditional Expression 3]

$25 < V1 - V5 < 45$ [Conditional Expression 4]

$0 < f2/f < 1.5$ [Conditional Expression 5]

$-3.0 < f3/f < -1.0$ [Conditional Expression 6]

$3.0 < |f4/f|$ [Conditional Expression 7]

$f5/f < 0$ [Conditional Expression 8]

$f6/f < 0$ [Conditional Expression 9]

$f7/f < 0$ [Conditional Expression 10]

$OAL/f < 1.4$ [Conditional Expression 11]

$1.3 < f1/f2$ [Conditional Expression 12]

$-2.0 < f2/f3 < 0$ [Conditional Expression 13]

$BFL/f < 0.4$ [Conditional Expression 14]

$D12/f < 0.1$ [Conditional Expression 15]

$0.2 < r7/f < 1.5$ [Conditional Expression 16]

$r11/f < 0.$ [Conditional Expression 17]

Here, f is an overall focal length of the optical imaging system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens. Furthermore, V1 is an Abbe number of the first lens, V2 is an Abbe number of the second lens, V3 is an Abbe number of the third lens, and V5 is an Abbe number of the fifth lens. In addition, OAL is a distance from the object-side surface of the first lens to the imaging plane, BFL is a distance from the image-side surface of the seventh lens to the imaging plane, and D12 is a distance from an image-side surface of the first lens to an object-side surface of the second lens. In the conditional expressions, r7 is a radius of curvature of an image-side surface of the third lens, and r11 is a radius of curvature of an image-side surface of the fifth lens.

Conditional Expression 1 is an equation to limit the refractive power of the first lens. For example, in an example in which f1/f is outside of the numerical range of Conditional Expression 1, the first lens would make it difficult to distribute the refractive power of other lenses.

Conditional Expressions 2 to 4 are equations to improve chromatic aberrations of the optical imaging system. For example, in a case in which V1−V2, V1−V3, and V1−V5 are outside of the numerical ranges of Conditional Expressions 2 to 4, respectively, it would be difficult to improve chromatic aberrations of the optical imaging system.

Conditional Expressions 5 to 7 are equations to improve aberrations of the optical imaging system. For example, in a case in which f2/f, f3/f, and |f4/f| are outside of the numerical ranges of Conditional Expressions 5 to 7, respectively, the refractive power of the second to fourth lenses of the optical imaging system is excessively small, such that it would be difficult to correct aberrations of the optical imaging system.

Conditional Expressions 8 to 10 are equations to limit the refractive power of the optical imaging system. For example, in a case in which f5/f, f6/f, and f7/f are outside of the numerical ranges of Conditional Expressions 8 to 10, respectively, the fifth to seventh lenses would make it difficult to design the optical imaging system.

Conditional Expressions 11 and 14 are equations to miniaturize the optical imaging system. For example, in a case in which OAUf and BFUf are outside of the numerical ranges of Conditional Expressions 11 and 14, respectively, a distance from the first lens to the imaging plane is excessively long, such that it would be difficult to miniaturize the optical imaging system.

Conditional Expressions 12 and 13 are equations to reduce aberrations of the optical imaging system. For example, in a case in which f1/f2 and f2/f3 are outside of the numerical ranges of Conditional Expressions 12 and 13, respectively, the refractive power of a specific lens of the first to third lenses is excessively large, such that aberration characteristics of the optical imaging system would increase.

Conditional Expressions 14 to 17 are equations to improve aberration characteristics of the optical imaging system.

In an example in which Conditional Expressions 14 to 17 are satisfied, the optical imaging system realizes a bright image. For example, the optical imaging system has an F number of 1.80 or less. In addition, the optical imaging system, according to an embodiment, realizes a resolution of 13 megapixels or more.

Next, optical imaging systems, according to several embodiments, will be described.

An optical imaging system, according to a first embodiment, will be described with reference to FIG. 1.

The optical imaging system 100, according to the first embodiment, includes an optical system including a first lens 110, a second lens 120, a third lens 130, a fourth lens 140, a fifth lens 150, a sixth lens 160, and a seventh lens 170. The first to seventh lenses 110 to 170 are sequentially disposed from an object toward an imaging plane 190. The first to seventh lenses 110 to 170 are spaced apart from each other at predetermined gaps or distances therebetween. For example, the first to seventh lenses 110 to 170 do not contact lenses neighboring thereto in a paraxial region. In an alternative embodiment, the second and the third lenses 120 and 130 may contact at a point of the optical axis or in a paraxial region.

The optical imaging system 100 includes a filter 180 and an image sensor. The filter 180 is disposed between the seventh lens 170 and the image sensor. The image sensor converts light refracted by the first to seventh lenses 110 to 170 into electrical signals, and provides an imaging plane 190 required for the optical imaging system 100.

The optical imaging system 100 includes one or more stops ST1 and ST2. A first stop ST1 is disposed adjacent to an object-side surface of the first lens, and a second stop ST2 is disposed between the second lens and the third lens. For reference, the second stop ST2 may be omitted, if necessary.

In an embodiment, the first lens 110 has a positive refractive power, and the object-side surface thereof is convex, while an image-side surface thereof is concave. The second lens 120 has a positive refractive power, and both surfaces thereof are convex. The third lens 130 has a negative refractive power, and an object-side surface thereof is convex and an image-side surface thereof is concave. The fourth lens 140 has a positive refractive power, and both surfaces thereof are convex. The fifth lens 150 has a negative refractive power, and an object-side surface thereof is concave, while an image-side surface thereof is convex. The sixth lens 160 has a negative refractive power, and an object-side surface thereof is convex and an image-side surface thereof is concave. One or more inflection points is formed on both surfaces of the sixth lens 160. The seventh lens 170 has a negative refractive power, and an object-side surface thereof is convex, while an image-side surface thereof is concave. One or more inflection points is formed on both surfaces of the seventh lens 170.

Figure 2:
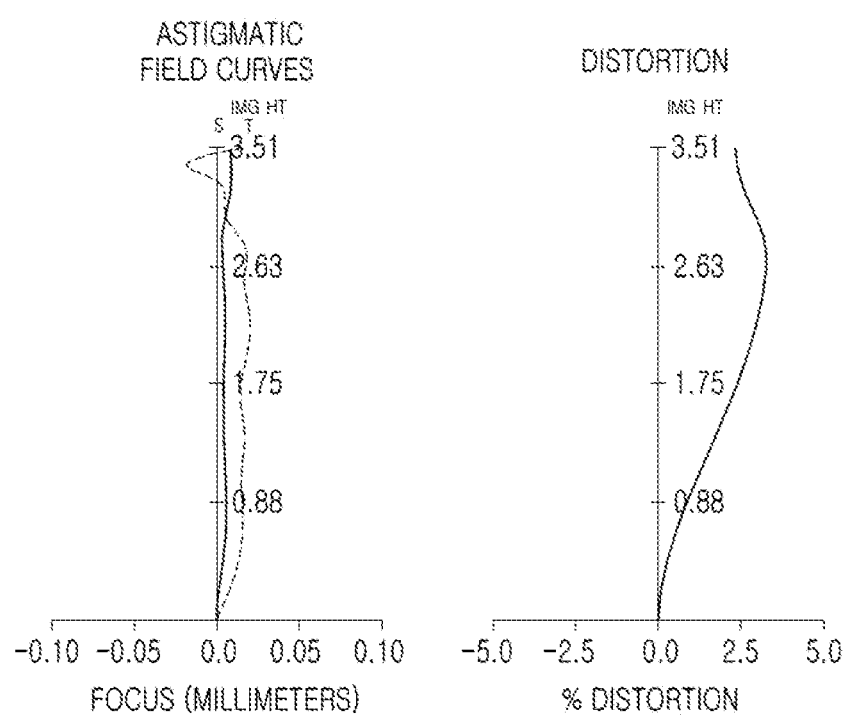
FIG. 2 are graphs representing aberration curves of the optical imaging system illustrated in FIG. 1.

The optical imaging system configured as described above represents aberration characteristics as illustrated in FIG. 2. For reference, IMG HT of FIG. 2 refers to ½ of a diagonal length of the imaging plane. In an embodiment, IMG HT is 3.51. FIGS. 3 and 4 are tables representing characteristics of lenses and aspherical characteristics of the optical imaging system, according to the first embodiment, respectively.

Figure 5:
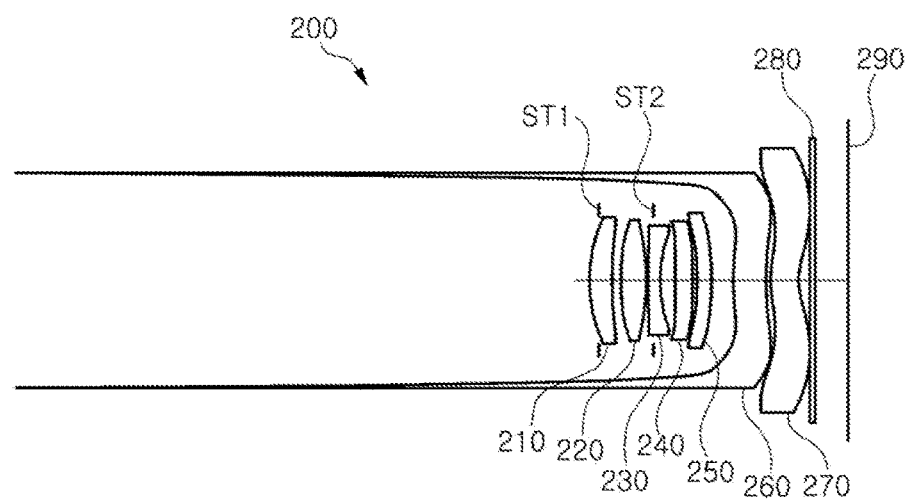
FIG. 5 is a view of an optical imaging system, according to a second embodiment.

Next, an optical imaging system, according to a second embodiment, will be described with reference to FIG. 5.

The optical imaging system 200, according to the second embodiment, includes an optical system including a first lens 210, a second lens 220, a third lens 230, a fourth lens 240, a fifth lens 250, a sixth lens 260, and a seventh lens 270. The first to seventh lenses 210 to 270 are sequentially disposed from an object toward an imaging plane 290. The first to seventh lenses 210 to 270 are also disposed to be spaced apart from each other at predetermined gaps. For example, the first to seventh lenses 210 to 270 do not contact lenses neighboring thereto in a paraxial region. In an alternative embodiment, the second and the third lenses 220 and 230 may contact at a point of the optical axis or in a paraxial region.

The optical imaging system 200 includes a filter 280 and an image sensor. The filter 280 is disposed between the seventh lens 270 and the image sensor. The image sensor converts light refracted by the first to seventh lenses 210 to 270 into electrical signals, and provides an imaging plane 290 required for the optical imaging system 200.

The optical imaging system 200 includes one or more stops ST1 and ST2. A first stop ST1 is disposed adjacent to an object-side surface of the first lens, and a second stop ST2 is disposed between the second lens and the third lens. For reference, the second stop ST2 may be omitted, if necessary.

In an embodiment, the first lens 210 has a positive refractive power, the object-side surface thereof is convex, and an image-side surface thereof is concave. The second lens 220 has a positive refractive power, and both surfaces thereof are convex. The third lens 230 has a negative refractive power, an object-side surface thereof is convex, while an image-side surface thereof is concave. The fourth lens 240 has a positive refractive power, and both surfaces thereof are convex. The fifth lens 250 has a negative refractive power, an object-side surface thereof is concave, and an image-side surface thereof is convex. The sixth lens 260 has a negative refractive power, while an object-side surface thereof is convex, and an image-side surface thereof is concave. One or more inflection points is formed on both surfaces of the sixth lens 260. The seventh lens 270 has a negative refractive power, while an object-side surface thereof is convex and an image-side surface thereof is concave. One or more inflection points is formed on both surfaces of the seventh lens 270.

Figure 6:
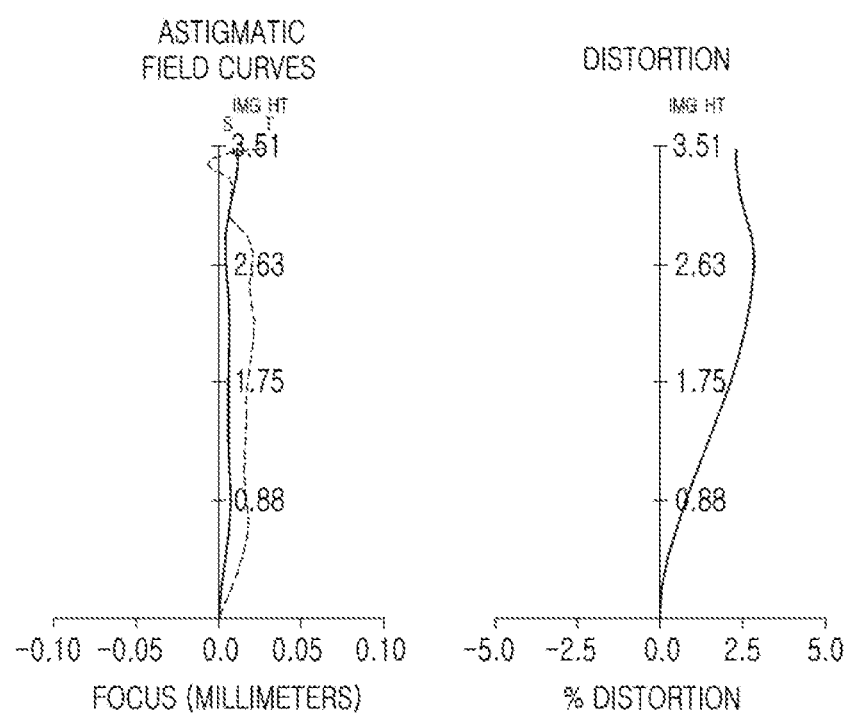
FIG. 6 are graphs representing aberration curves of the optical imaging system illustrated in FIG. 5.

The optical imaging system configured as described above represents aberration characteristics as illustrated in FIG. 6. In an embodiment, IMG HT may be 3.51, as illustrated in FIG. 6. FIGS. 7 and 8 are tables representing characteristics of lenses and aspherical characteristics of the optical imaging system, according to the second embodiment, respectively.

Figure 9:
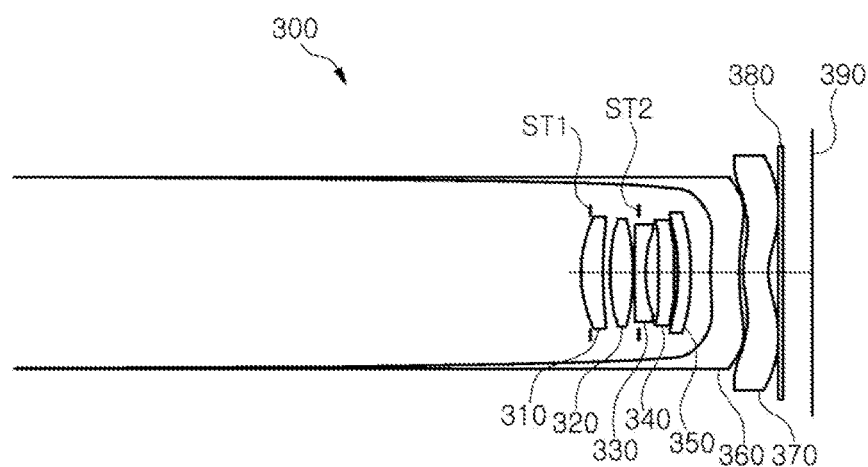
FIG. 9 is a view of an optical imaging system, according to a third embodiment.

An optical imaging system, according to a third embodiment, will be described with reference to FIG. 9.

The optical imaging system 300, according to the third embodiment, includes an optical system including a first lens 310, a second lens 320, a third lens 330, a fourth lens 340, a fifth lens 350, a sixth lens 360, and a seventh lens 370. The first to seventh lenses 310 to 370 are sequentially disposed from an object toward an imaging plane 390. The first to seventh lenses 310 to 370 are disposed to be spaced apart from each other at predetermined gaps. For example, the first to seventh lenses 310 to 370 do not contact lenses neighboring thereto in a paraxial region. In an alternative embodiment, the second and the third lenses 320 and 330 may contact at a point of the optical axis or in a paraxial region.

The optical imaging system 300 includes a filter 380 and an image sensor. The filter 380 is disposed between the seventh lens 370 and the image sensor. The image sensor converts light refracted by the first to seventh lenses 310 to 370 into electrical signals, and provides an imaging plane 390 required for the optical imaging system 300.

The optical imaging system 300 includes one or more stops ST1 and ST2. A first stop ST1 is disposed adjacent to an object-side surface of the first lens, and a second stop ST2 is disposed between the second lens and the third lens. For reference, the second stop ST2 may be omitted, if necessary.

In an embodiment, the first lens 310 has a positive refractive power, the object-side surface thereof is convex, and an image-side surface thereof is concave. The second lens 320 has a positive refractive power, and both surfaces thereof are convex. The third lens 330 has a negative refractive power, an object-side surface thereof is convex and an image-side surface thereof is concave. The fourth lens 340 has a positive refractive power, and both surfaces thereof are convex. The fifth lens 350 has a negative refractive power, an object-side surface thereof is concave, while an image-side surface thereof is convex. The sixth lens 360 has a negative refractive power, an object-side surface thereof is convex, and an image-side surface thereof is concave. One or more inflection points is formed on both surfaces of the sixth lens 360. The seventh lens 370 has a negative refractive power, an object-side surface thereof is convex, and an image-side surface thereof is concave. One or more inflection points is formed on both surfaces of the seventh lens 370.

Figure 10:
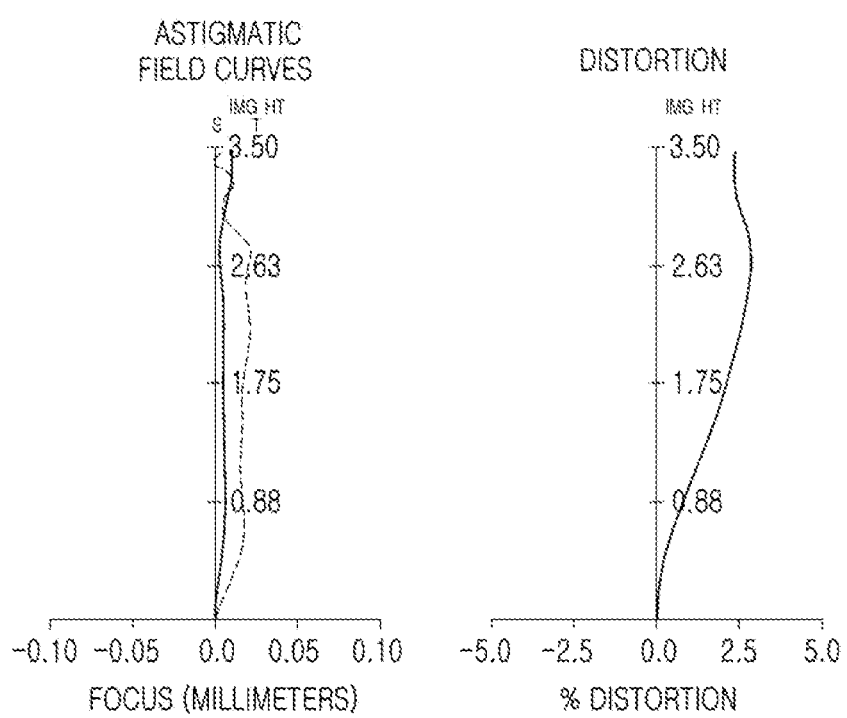
FIG. 10 shows graphs representing aberration curves of the optical imaging system illustrated in FIG. 9.

The optical imaging system configured as described above represents aberration characteristics as illustrated in FIG. 10. In an embodiment, IMG HT may be 3.50, as illustrated in FIG. 10. FIGS. 11 and 12 are tables representing characteristics of lenses and aspherical characteristics of the optical imaging system, according to the third embodiment, respectively.

Figure 13:
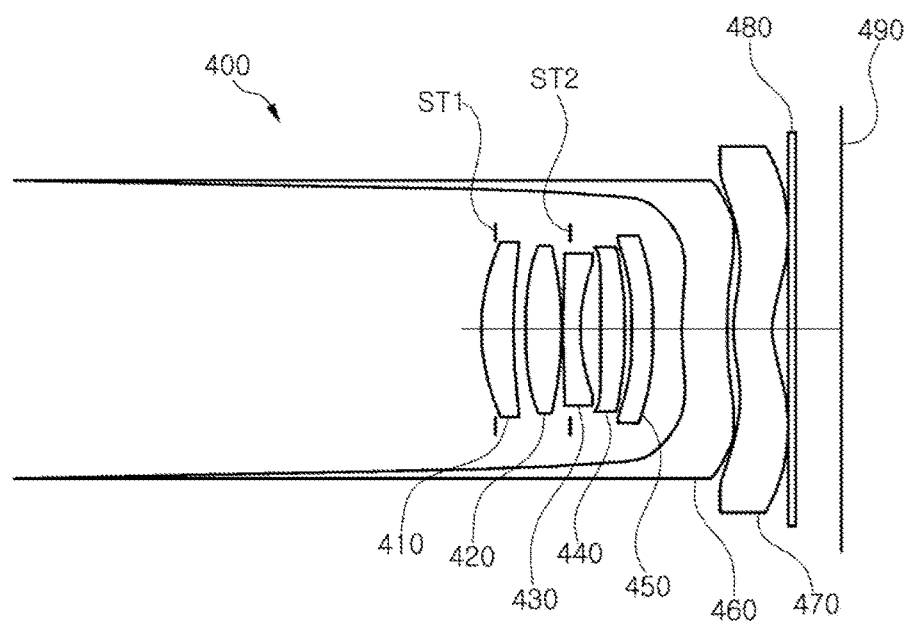
FIG. 13 is a view of an optical imaging system, according to a fourth embodiment.

Following is a description of an optical imaging system according to a fourth exemplary embodiment, with reference to FIG. 13.

The optical imaging system 400, according to the fourth embodiment includes an optical system, including a first lens 410, a second lens 420, a third lens 430, a fourth lens 440, a fifth lens 450, a sixth lens 460, and a seventh lens 470. The first to seventh lenses 410 to 470 are sequentially disposed from an object toward an imaging plane 490. The first to seventh lenses 410 to 470 are disposed to be spaced apart from each other at predetermined gaps. For example, the first to seventh lenses 410 to 470 do not contact lenses neighboring thereto in a paraxial region. In an alternative embodiment, the second and the third lenses 420 and 430 may contact at a point of the optical axis or in a paraxial region.

The optical imaging system 400 includes a filter 480 and an image sensor. The filter 480 is disposed between the seventh lens 470 and the image sensor. The image sensor converts light refracted by the first to seventh lenses 410 to 470 into electrical signals, and provides an imaging plane 490 required for the optical imaging system 400.

The optical imaging system 400 includes one or more stops ST1 and ST2. A first stop ST1 is disposed adjacent to an object-side surface of the first lens, and a second stop ST2 is disposed between the second lens and the third lens. For reference, the second stop ST2 may be omitted, if necessary.

In an embodiment, the first lens 410 has a positive refractive power, the object-side surface thereof is convex, and an image-side surface thereof is concave. The second lens 420 has a positive refractive power, and both surfaces thereof are convex. The third lens 430 has a negative refractive power, while an object-side surface thereof is convex, and an image-side surface thereof is concave. The fourth lens 440 has a positive refractive power, and both surfaces thereof are convex. The fifth lens 450 has a negative refractive power, an object-side surface thereof is concave, and an image-side surface thereof is convex. The sixth lens 460 has a negative refractive power, while an object-side surface thereof is convex, and an image-side surface thereof is concave. One or more inflection points is formed on both surfaces of the sixth lens 460. The seventh lens 470 has a negative refractive power, an object-side surface thereof is convex, and an image-side surface thereof is concave. One or more inflection points is formed on both surfaces of the seventh lens 470.

Figure 14:
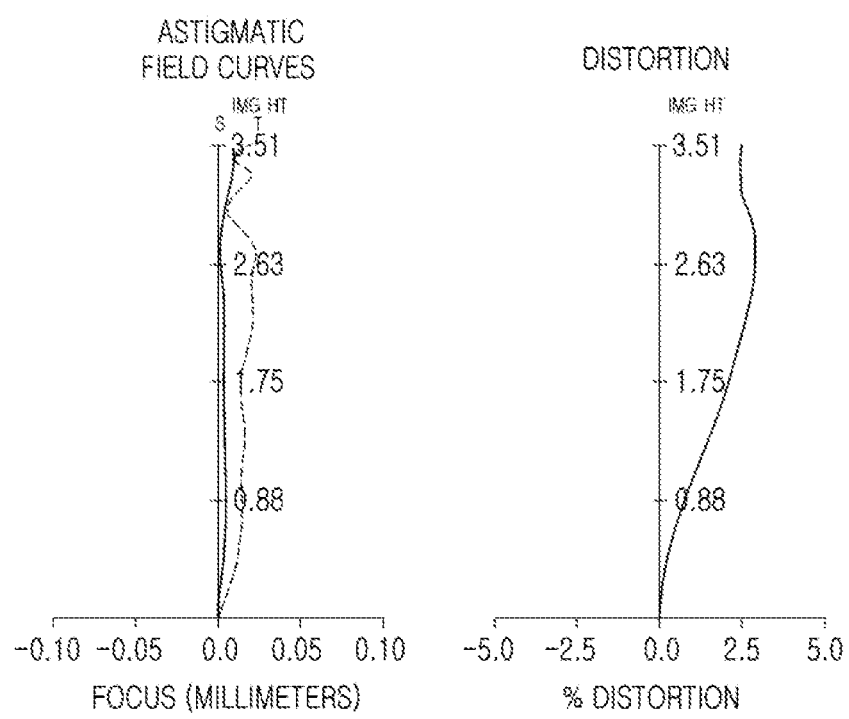
FIG. 14 shows graphs representing aberration curves of the optical imaging system illustrated in FIG. 13.

The optical imaging system configured as described above represents aberration characteristics, as illustrated in FIG. 14. In an embodiment, IMG HT may be 3.51, as illustrated in FIG. 14. FIGS. 15 and 16 are tables representing characteristics of lenses and aspherical characteristics of the optical imaging system, according to the fourth embodiment, respectively.

Table 1 represents values of Conditional Expressions of the optical imaging systems, according to the first to fourth embodiments.

TABLE 1

| Conditional Expression | First Embodiment | Second Embodiment | Third Embodiment | Fourth Embodiment |
|---|---|---|---|---|
| f1/f | 1.641 | 1.650 | 1.653 | 1.652 |
| V1 − V2 | 0 | 0 | 0 | 0 |
| V1 − V3 | 34.60 | 34.60 | 34.60 | 34.60 |
| V1 − V5 | 30.10 | 30.10 | 30.10 | 30.10 |
| f2/f | 1.036 | 1.030 | 1.030 | 1.030 |
| f3/f | −1.146 | −1.148 | −1.146 | −1.146 |
| |f4/f| | 3.676 | 3.550 | 3.550 | 3.196 |
| f5/f | −229.88 | −114.94 | −68.97 | −22.99 |
| f6/f | −229.88 | −115.06 | −68.97 | −22.99 |
| f7/f | −2.013 | −1.929 | −2.010 | −2.172 |
| OAL/f | 1.217 | 1.213 | 1.215 | 1.215 |
| f1/f2 | 1.584 | 1.602 | 1.605 | 1.604 |
| f2/f3 | −0.904 | −0.897 | −0.899 | −0.899 |
| BFL/f | 0.235 | 0.233 | 0.233 | 0.233 |
| D12/f | 0.038 | 0.038 | 0.038 | 0.039 |
| r7/f | 0.526 | 0.527 | 0.526 | 0.526 |
| r11/f | −1.519 | −1.670 | −1.662 | −1.465 |

As set forth above, according to embodiments, an optical imaging system may be mounted in a small terminal and include a high level of resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens comprising a positive refractive power;
a second lens comprising a positive refractive power;
a third lens comprising a negative refractive power, an object-side surface of the third lens being convex;
a fourth lens comprising a positive refractive power;
a fifth lens comprising a negative refractive power;
a sixth lens comprising a negative refractive power, wherein an object-side surface of the sixth lens is convex, and an image-side surface of the sixth lens is concave; and
a seventh lens comprising a negative refractive power and comprising an inflection point formed on an image-side surface thereof,
wherein the first to seventh lenses are sequentially disposed from an object side toward an imaging plane.

2. The optical imaging system of claim 1, wherein an object-side surface of the first lens is convex, and an image-side surface of the first lens is concave.

3. The optical imaging system of claim 1, wherein an object-side surface and an image-side surface of the second lens are convex.

4. The optical imaging system of claim 1, wherein an image-side surface of the third lens is concave.

5. The optical imaging system of claim 1, wherein an object-side surface and an image-side surface of the fourth lens are convex.

6. The optical imaging system of claim 1, wherein an object-side surface of the fifth lens is concave, and an image-side surface of the fifth lens is convex.

7. The optical imaging system of claim 1, wherein OAL/f<1.4, BFL/f<0.4, D12/f<0.1, and 0.2<r7/f<1.5, of which f is an overall focal length of the optical imaging system, OAL is a distance from the object-side surface of the first lens to the imaging plane, BFL is a distance from the image-side surface of the seventh lens to the imaging plane, D12 is a distance from an image-side surface of the first lens to an object-side surface of the second lens, and r7 is a radius of curvature of an image-side surface of the third lens.

8. The optical imaging system of claim 1, wherein an object-side surface of the seventh lens is convex, and an image-side surface of the seventh lens is concave.

9. The optical imaging system of claim 1, wherein 0<f1/f<2.0, in which f is an overall focal length of the optical imaging system and f1 is a focal length of the first lens.

10. The optical imaging system of claim 1, wherein 0<f2/f<1.5, in which f is an overall focal length of the optical imaging system and f2 is a focal length of the second lens.

11. The optical imaging system of claim 1, wherein −3.0<f3/f<−1.0, in which f is an overall focal length of the optical imaging system and f3 is a focal length of the third lens.

12. The optical imaging system of claim 1, wherein 3.0<|f4/f|, in which f is an overall focal length of the optical imaging system and f4 is a focal length of the fourth lens.

13. The optical imaging system of claim 1, wherein 1.3<f1/f2, in which f1 is a focal length of the first lens and f2 is a focal length of the second lens.

14. The optical imaging system of claim 1, wherein −2.0<f2/f3<0, in which f2 is a focal length of the second lens and f3 is a focal length of the third lens.

15. The optical imaging system of claim 1, wherein r11/f<0, in which is an overall focal length of the optical imaging system and r11 is a radius of curvature of an image-side surface of the fifth lens.

16. The optical imaging system of claim 1, wherein the first to seventh lenses are spaced apart from each other at predetermined gaps or distances therebetween.

17. The optical imaging system of claim 1, wherein V1−V2<25, 25<V1−V3<45, and 25<V1−V5<45, in which V1 is an Abbe number of the first lens, V2 is an Abbe number of the second lens, V3 is an Abbe number of the third lens, and V5 is an Abbe number of the fifth lens.

18. The optical imaging system of claim 1, wherein f5/f<0, f6/f<0, and f7/f<0, of which f is an overall focal length of the optical imaging system, f5 is a focal length of the fifth lens, f6 is a focal length of the sixth lens, and f7 is a focal length of the seventh lens.

19. An optical imaging system, comprising:
a first lens comprising a positive refractive power;
a second lens comprising a positive refractive power;
a third lens comprising a negative refractive power, an object-side surface of the third lens being convex;
a fourth lens comprising a positive refractive power;
a fifth lens comprising a negative refractive power;
a sixth lens comprising a negative refractive power; and
a seventh lens comprising a negative refractive power and comprising an inflection point formed on an image-side surface thereof,
wherein 3.0<|f4/f|, in which f is an overall focal length of the optical imaging system and f4 is a focal length of the fourth lens, and
wherein the first to seventh lenses are sequentially disposed from an object side toward an imaging plane.

20. The optical imaging system of claim 19, wherein an object-side surface of the first lens is convex, and an image-side surface of the first lens is concave.

21. The optical imaging system of claim 19, wherein an object-side surface and an image-side surface of the second lens are convex.

22. The optical imaging system of claim 19, wherein an image-side surface of the third lens is concave.

23. The optical imaging system of claim 19, wherein an object-side surface and an image-side surface of the fourth lens are convex.

24. The optical imaging system of claim 19, wherein an object-side surface of the fifth lens is concave, and an image-side surface of the fifth lens is convex.

25. The optical imaging system of claim 19, wherein an object-side surface of the sixth lens is convex, and an image-side surface of the sixth lens is concave.

26. The optical imaging system of claim 19, wherein an object-side surface of the seventh lens is convex, and an image-side surface of the seventh lens is concave.

27. The optical imaging system of claim 19, wherein 0<f1/f<2.0, in which f is an overall focal length of the optical imaging system and f1 is a focal length of the first lens.

28. The optical imaging system of claim 19, wherein 0<f2/f<1.5, in which f is an overall focal length of the optical imaging system and f2 is a focal length of the second lens.

29. The optical imaging system of claim 19, wherein −3.0<f3/f<−1.0, in which f is an overall focal length of the optical imaging system and f3 is a focal length of the third lens.

30. The optical imaging system of claim 19, wherein 1.3<f1/f2, in which f1 is a focal length of the first lens and f2 is a focal length of the second lens.

31. The optical imaging system of claim 19, wherein −2.0<f2/f3<0, in which f2 is a focal length of the second lens and f3 is a focal length of the third lens.

32. The optical imaging system of claim 19, wherein r11/f<0, in which is an overall focal length of the optical imaging system and r11 is a radius of curvature of an image-side surface of the fifth lens.

33. The optical imaging system of claim 19, wherein the first to seventh lenses are spaced apart from each other at predetermined gaps or distances therebetween.

34. The optical imaging system of claim 19, wherein V1−V2<25, 25<V1−V3<45, and 25<V1−V5<45, in which V1 is an Abbe number of the first lens, V2 is an Abbe number of the second lens, V3 is an Abbe number of the third lens, and V5 is an Abbe number of the fifth lens.

35. The optical imaging system of claim 19, wherein f5/f<0, f6/f<0, and f7/f<0, of which f is an overall focal length of the optical imaging system, f5 is a focal length of the fifth lens, f6 is a focal length of the sixth lens, and f7 is a focal length of the seventh lens.

36. The optical imaging system of claim 19, wherein OAL/f<1.4, BFL/f<0.4, D12/f<0.1, and 0.2<r7/f<1.5, of which f is an overall focal length of the optical imaging system, OAL is a distance from the object-side surface of the first lens to the imaging plane, BFL is a distance from the image-side surface of the seventh lens to the imaging plane, D12 is a distance from an image-side surface of the first lens to an object-side surface of the second lens, and r7 is a radius of curvature of an image-side surface of the third lens.

\* \* \* \* \*